United States Patent
Kurian et al.

(10) Patent No.: US 10,462,126 B2
(45) Date of Patent: *Oct. 29, 2019

(54) SELF-ADJUSTING MULTIFACTOR NETWORK AUTHENTICATION

(71) Applicant: BANK OF AMERICA CORPORATION, Charlotte, NC (US)

(72) Inventors: Manu J. Kurian, Dallas, TX (US); James M. Heddleson, Charlotte, NC (US); Morgan S. Allen, Charlotte, NC (US); Ashish Arora, Issaquah, WA (US)

(73) Assignee: Bank of America Corporation, Charlotte, NC (US)

( * ) Notice: Subject to any disclaimer, the term of this patent is extended or adjusted under 35 U.S.C. 154(b) by 170 days.

This patent is subject to a terminal disclaimer.

(21) Appl. No.: 15/679,994

(22) Filed: Aug. 17, 2017

(65) Prior Publication Data

US 2019/0058702 A1 Feb. 21, 2019

(51) Int. Cl.
*H04L 9/00* (2006.01)
*H04L 29/06* (2006.01)

(52) U.S. Cl.
CPC ............ *H04L 63/083* (2013.01); *H04L 63/08* (2013.01); *H04L 63/102* (2013.01); *H04L 63/107* (2013.01); *H04L 63/205* (2013.01); *H04L 63/062* (2013.01); *H04L 63/0853* (2013.01)

(58) Field of Classification Search
CPC ..................................................... H04L 63/18
See application file for complete search history.

(56) References Cited

U.S. PATENT DOCUMENTS

| | | | |
|---|---|---|---|
| 8,285,681 B2 | 10/2012 | Prahlad et al. |
| 8,527,549 B2 | 9/2013 | Cidon |
| 8,762,642 B2 | 6/2014 | Bates et al. |
| 8,788,628 B1 | 7/2014 | Taylor et al. |
| 8,805,951 B1 | 8/2014 | Faibish et al. |
| 8,805,968 B2 | 8/2014 | Taylor et al. |

(Continued)

OTHER PUBLICATIONS

Kurian, M. J. et al., "Multifactor Network Authentication," U.S. Appl. No. 15/679,793, filed Aug. 17, 2017, 44 pages.

(Continued)

*Primary Examiner* — Josnel Jeudy
(74) *Attorney, Agent, or Firm* — Michael A. Springs

(57) ABSTRACT

A network authentication device that includes an authentication engine. The authentication engine is configured to receive an authentication key request from a user device that identifies an account. The authentication engine is configured to obtain an authentication key and to establish a first set of authentication rules for the authentication key. The authentication engine is configured to identify one or more triggering events associated with an increased threat to the account and to establish a second set of authentication rules for the authentication key. The authentication engine is configured to perform key validation for the authentication key using the first set of authentication rules and to send the authentication key to the user device. The authentication engine is configured to detect a triggering event from the one or more triggering events has occurred and perform the key validation for the authentication key using the second set of authentication rules.

20 Claims, 4 Drawing Sheets

(56) References Cited

U.S. PATENT DOCUMENTS

| | | | |
|---|---|---|---|
| 8,832,820 | B2 | 9/2014 | Barjatiya et al. |
| 8,850,130 | B1 | 9/2014 | Aron et al. |
| 9,147,195 | B2 | 9/2015 | Sivaramakrishnan et al. |
| 9,256,374 | B1 | 2/2016 | Aron et al. |
| 9,398,087 | B1 | 7/2016 | Hosie et al. |
| 9,424,437 | B1 | 8/2016 | Ancin et al. |
| 9,454,398 | B2 | 9/2016 | Hacker |
| 9,479,503 | B2 | 10/2016 | Griffin et al. |
| 9,532,220 | B2 * | 12/2016 | Lee ............... H04W 12/04 |
| 9,565,200 | B2 | 2/2017 | Bacastow et al. |
| 9,571,282 | B1 | 2/2017 | Aggarwal et al. |
| 9,578,002 | B2 | 2/2017 | Wu |
| 9,596,223 | B1 | 3/2017 | Mezei et al. |
| 2015/0350205 | A1 * | 12/2015 | Oyman ............ H04L 63/126 726/7 |
| 2016/0132866 | A1 * | 5/2016 | Gui ............... H04L 67/1097 705/35 |
| 2017/0039218 | A1 | 2/2017 | Prahlad et al. |
| 2018/0183586 | A1 * | 6/2018 | Bhargav-Spantzel ............... H04L 9/0861 |

OTHER PUBLICATIONS

Safenet, "Future-Proofing Your Authentication Infrastructure Key Strategies for Maximizing Security and Flexibility in the Long Term White Paper," http://www2.gemalto.com/adwords/authentication/whitepaper/assets/FutureProofingYourAuthenticationInfrastructure_WP_(EN)_web.pdf, retrieved Aug. 7, 2017, pp. 1-7.

The Chertoff Group, "Think Cloud Compliance Secure Biometric Authentication: A Fundamental Building Block for Achieving Trusted Cloud Services," https://www.chertoffgroup.com/files/docs/Secure-Biometric-Authentication-Achieving-Trusted-Cloud-Services(3).pdf, retrieved Aug. 7, 2017, pp. 1-14.

Portela, F. F. L., "Metadata, Scanning and Security in the Cloud," https://www.ibm.com/blogs/cloud-computing/2013/08/metadata-scanning-and-security-in-the-cloud/, Aug. 19, 2013, 8 pages.

Ruiz-Martinez, A. et al., "Architecture and Protocols for Secure Information Technology Infrastructures," Sep. 2013, pp. 1-45.

* cited by examiner

SELF-ADJUSTING MULTIFACTOR NETWORK AUTHENTICATION

TECHNICAL FIELD

The present disclosure relates generally to information security, and more specifically to a system using multifactor network authentication for data access control.

BACKGROUND

In a network environment, devices are in data communication with other devices that may be physically distributed anywhere in the world. One of the technical challenges that occurs in a network environment deals with authenticating users and user devices to protect the system and network from data leakage, unauthorized access, and/or other malicious activities. For example, bad actors may attempt to perform malicious activities over the network such as data exfiltration or fraud.

Conventional systems use a fixed predetermined set of authentication rules for authenticating users. The number of authentication rules and type of authentication rules are fixed and set by the authenticating device. Modern networks include a wide variety of network devices with different types of functionality. Some devices may limit a user's ability to perform certain types of actions that may be necessary for satisfying one or more authentication rules. For example, an authentication rule may require some kind of biometric test, but the user's device may not have the ability to perform any kind of biometric test. Using a rigid set of authentication rules limits conventional systems and does not provide the flexibility to support a wide variety of devices with different types of functionality. Thus, it is desirable to provide a solution that offers flexible authentication that supports a variety of devices to provide increased network security.

SUMMARY

One of the technical challenges that occurs in a network environment deals with authenticating users and user devices to protect the system and network from data leakage, unauthorized access, and/or other malicious activities. This technical challenge is inherent to networking environments because the security of the system depends on the system's ability to identify and control which users and devices have access to the network data. Conventional systems use a fixed predetermined set of authentication rules for authenticating users. The number of authentication rules and type of authentication rules are fixed and set by the authenticating device. Modern networks include a wide variety of devices with different types of functionality. Some devices may limit a user's ability to perform certain types of actions that may be necessary for satisfying one or more authentication rules. For example, an authentication rule may require some kind of biometric test, but the user's device may not have the ability to perform any kind of biometric test. Using a rigid set of authentication rules limits conventional systems and does not provide the flexibility to support a wide variety of devices with different types of functionality. Thus, conventional systems are unable to provide access control and authentication support for modern networks that include a variety of device types.

The system described in the present application provides a technical solution that enables the system to provide access control and authentication support for networks with a variety of device types. In one embodiment, the system is configured to obtain authentication keys for a user's account and to link the authentication keys with one or more flexible sets of authorization rules. The authorization rules may be user defined to include any number of rules and/or types of authentication rules. For example, the authorization rules may be set based on the capabilities of a user's device and/or their preferences. In one embodiment, the system is configured to automatically change the set of authentication rules in response to detecting a triggering event which indicates a potential threat to the user's account. The system may change authentication rules to include more levels of authentication rules and/or more secure types of authentication rules. For example, the system may increase the number of authentication rules used in a set of authentication rules in response to detecting suspicious user activity. In some embodiments, the system may change the set of authentication rules to include some level of authentication based on the user's history. For example, the system may use information stored in a cloud server that is linked with a user as part of the authentication rules. The system provides a technical advantage by allowing user-defined authentication rules that can be dynamically changed to provide increased security when necessary. This process provides improved functionality to the system by allowing the system to support a large number of devices and allowing the system to optimize authentication rules based on the capabilities of the different types of devices.

In one embodiment, the system allows an authentication key that is linked with an account to be split and used by multiple users. Each portion of the authentication key may be linked with its own set of user-defined authentication rules. The system uses portions of the authentication key to enable multifactor authentication both vertically by using authentication rules and horizontally by involving multiple users and their respective sets of authentication rules. For example, in a custodial relationship, a user can give account access or permissions to another user by using an authentication key that uses authentication rules from both users before allowing actions to be performed in the network. This process provides a technical advantage that increases network security by distributing an authentication key among multiple users with different sets of authentication rules which increases the number of authentication rules that are satisfied before performing any actions. This process benefits from the flexible authentication rules that can be dynamically change authentication rules in response to triggering events to provide increased security.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
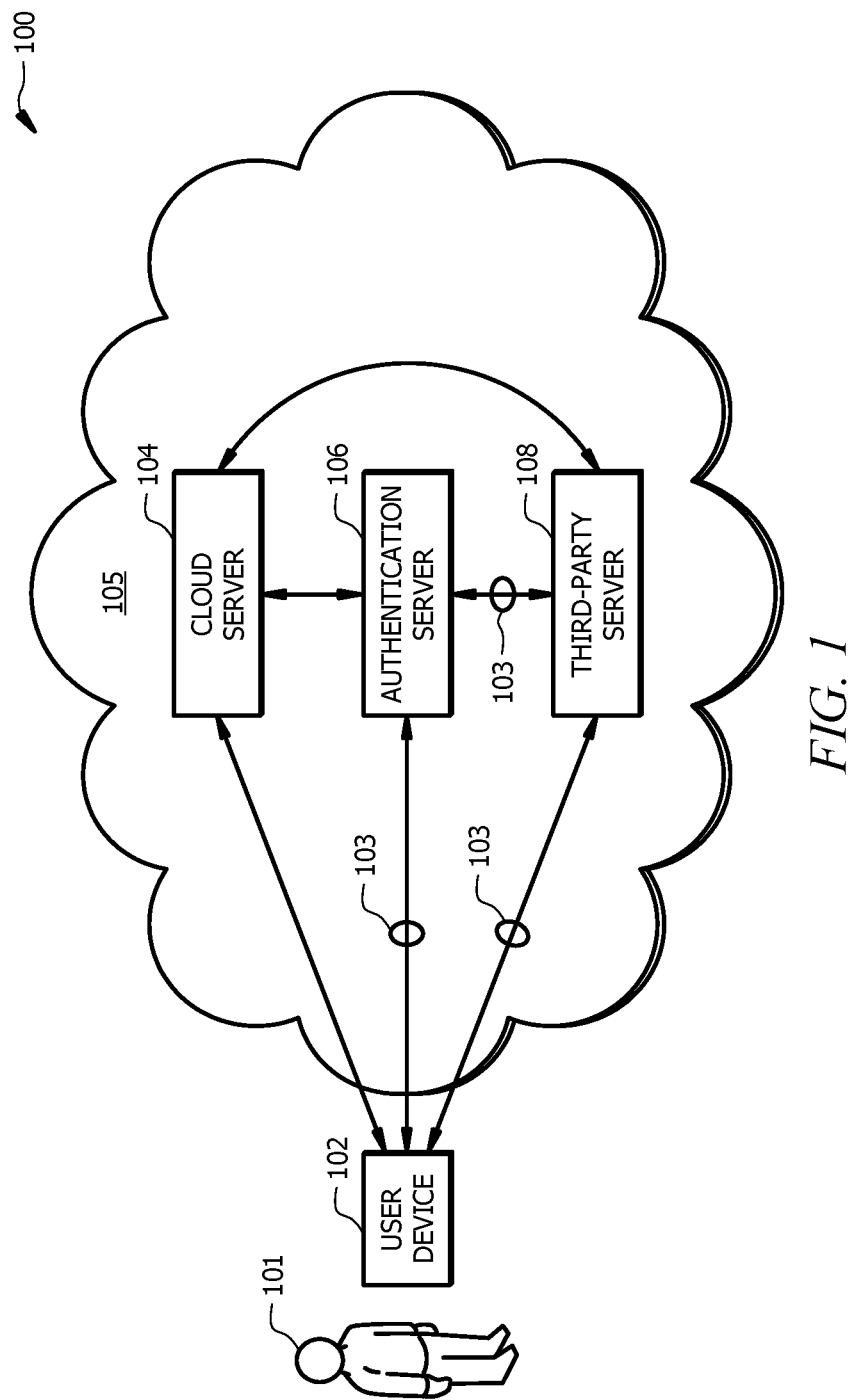
FIG. 1 is a schematic diagram of an embodiment of a system configured to employ multifactor network authentication.

FIG. 1 is a schematic diagram of an embodiment of a system 100 configured to employ multifactor network authentication. In FIG. 1, a user 101 operating a user device 102 requests an authentication key 103 from an authentication server 106 that allows the user 101 to authenticate itself with other devices (e.g. a third-party server 108) in a network 105. For example, the user 101 may want to perform an action related to a user's account over the network 105. For example, a user may want to access data (e.g. account information or files), send or receive data, perform a transaction, and/or any other suitable type of operation. As an example, when the user 101 attempts to perform an action related to their account with a third-party server 108, the third-party server 108 may prompt the user 101 to authentication themselves with an authentication key 103 before performing any actions. The user 101 is authenticated once the user 101 uses their authentication key 103 and satisfies the authentication rules linked with the authentication key 103.

Examples of the user device 102 include, but are not limited to, desktop computers, mobile phones, tablet computers, and laptop computers. The user device 102 is generally configured to communicate data with other devices in the network 105, for example, cloud server 104, authentication server 106, and one or more third-party servers 108. The user device 102 may be configured to request an authentication key 103 for a user's account from the authentication server 106 and to use the authentication key 103 to authenticate its user 101 when requesting to perform an action on the account with other devices (e.g. a third-party server 108) in the network 105. Examples of the user device 102 requesting and using authentication keys 103 are described in FIGS. 3 and 4.

The network 105 is any suitable type of wireless and/or wired network including, but not limited to, all or a portion of a public network, a private network, the Internet, an Intranet, a peer-to-peer network, the public switched telephone network, a cellular network, and a satellite network. The network 105 is configured to support any suitable communication protocols as would be appreciated by one of ordinary skill in the art upon viewing this disclosure. The network 105 comprises one or more cloud servers 104, an authentication server 106, and one or more third-party servers 108. The network 105 may be configured as shown in FIG. 1 or in any other suitable configuration. The user devices 102, cloud server 104, authentication server 106, and third-party server 108 are in signal communication with each other and may communicate with each other using any suitable messaging technique or protocol as would be appreciated by one of ordinary skill in the art upon viewing this disclosure.

The cloud server 104 is a network device configured to collect and store information linked with different users 101. For example, the cloud server 104 may be a server configured to operate as a software as a service (SaaS) server, a web server, a database, a file repository, a file hosting server, or any other suitable web-enabled server. The cloud server 104 is in signal communication with user devices 102, authentication server 106, and/or one or more third-party servers 108. The cloud server 104 is configured to host and/or is linked with one or more user accounts. Examples of accounts include, but are not limited to, online accounts, subscription services, social media accounts, product accounts, financial accounts, and/or any other suitable type of web-enabled accounts. For example, a user 101 may establish communications by logging in with their user device 102 to the cloud server 104 to allow data to be exchanged between the user device 102 and the cloud server 104. The cloud server 104 is configured to store account information, personal information, contact information, online search history, location history, financial transaction history, and/or any other type of information linked with a user 101 and/or their account. Examples of the cloud server 104 in operation are described in FIGS. 3 and 4.

The authentication server 106 is in signal communication with user devices 102, the cloud server 104, and/or one or more third-party servers 108. The authentication server 106 is a network device configured to authentication users 101 using authentication keys 103 and authentication rules linked with the authentication keys 103. Additional information about the authentication server 106 is described in FIG. 2.

In one embodiment, the authentication server 106 is configured to obtain or generate an authentication key 103 for a user 101 and to link the authentication key 103 with one or more sets of authentication rules that are used to authenticate the user 101. The authentication rules may include any number of rules and/or type of authentication rules. Authentication rules identify actions or responses to questions or stimuli the users 101 can provide to authenticate themselves. Examples of types of actions or responses a user 101 can provide to satisfy authentication rules include, but are not limited to, text responses, touchscreen gestures, voice samples, retina scans, fingerprints, geolocation information, user device information, and/or any other suitable type of information or biometric sample. Examples of the authentication server 106 in operation are described in FIGS. 3 and 4.

In one embodiment, the authentication server 106 is configured to automatically change the authentication rules linked with an authentication key 103 in response to detecting a triggering event. A triggering event is an event or action associated with an increased threat to a user's account. Triggering events may be used to detect suspicious or malicious activities such as fraud. Examples of triggering events include, but are not limited to, exceeding a spending threshold, receiving a transaction request that exceeds a threshold, determining a user device 102 is in a high-crime area, determining a user device 102 is not in a location a user 101 typically visits, determining a user device 102 that is using an authentication key 103 is not associated with a user 101, and/or any other suitable type of event or unusual activity. The authentication server 106 may change the authentication rules linked with an authentication key 103 to use more levels of authentication rules and/or more secure types of authentication rules such as biometric or geolocation type authentication rules. An example of the authentication server 106 operating in this configuration is described in FIG. 3.

In one embodiment, the authentication server 106 is configured to allow an authentication key 103 linked with an account to be split among multiple users 101. Each fragment or portion of the authentication key 103 may be linked with different sets of authentication rules for its respective user 101. Using authentication key fragments, the authentication server 106 enables multifactor authentication both vertically by using a set of authentication rules and horizontally by involving multiple user's 101 and their respective sets of authentication rules. Using authentication key fragments, the authentication server 106 increases network security by distributing portions of an authentication key 103 among multiple users 101 which each have different sets of authentication rules. An example of the authentication server 106 operating in this configuration is described in FIG. 4.

In one embodiment, the third-party server 108 is a server owned or managed by a third-party source. Examples of third-party sources include, but are not limited to, vendors, institutions, and businesses. The third-party server 108 may be configured to facilitate providing services or products to a user 101 via a user device 102. For example, the third-party server 108 may be associated with a device (e.ga point-of-sale (POS) terminal) in a physical store or an online store. The third-party server 108 may require a user 101 to authenticate themselves before providing services or products to the user device 102. The third-party server 108 is configured to exchange information (e.g. an authentication key 103) with the authentication server 106 and/or the user device 102 to authenticate a user 101. An example of a third-party server 108 in operation is described in FIG. 4.

The network 105 may further comprise one or more other network devices (not shown). Examples of network device include, but are not limited to, web clients, web servers, user devices, mobile phones, computers, tablet computers, laptop computers, POS terminals, and/or any other suitable type of devices.

Figure 2:
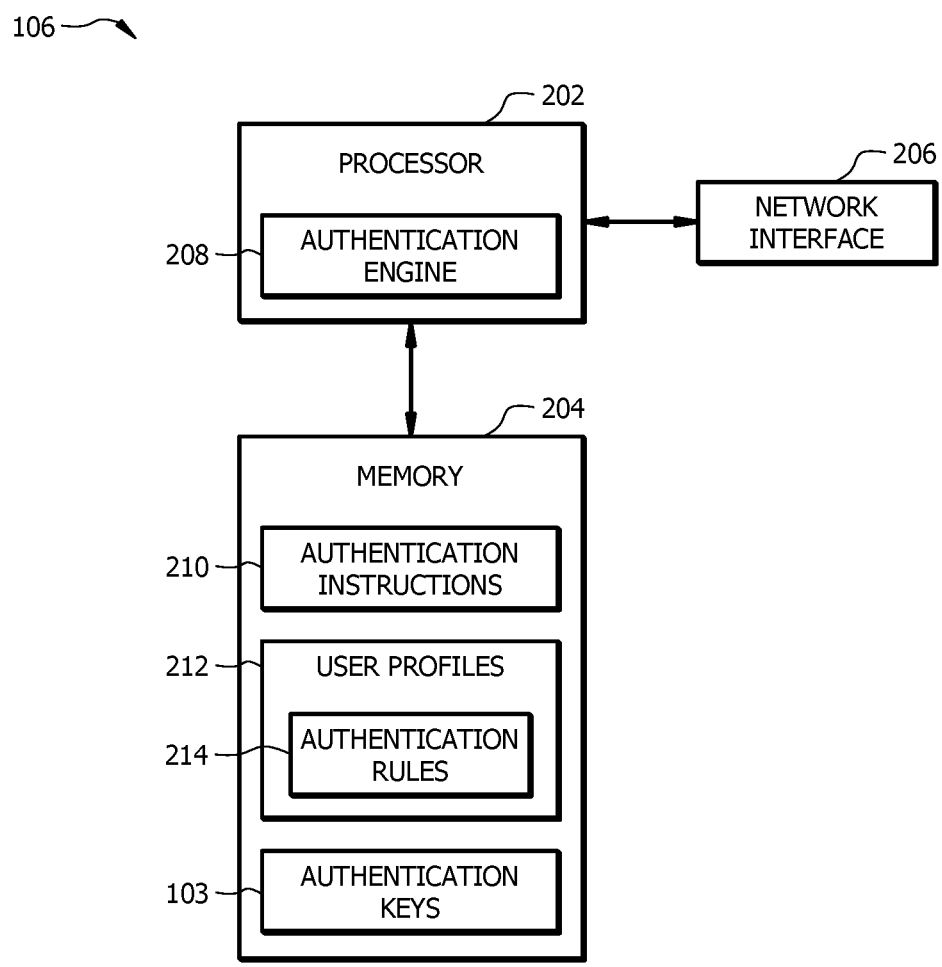
FIG. 2 is a schematic diagram of an embodiment of an authentication server.

FIG. 2 is a schematic diagram of an embodiment of an authentication server 106. The authentication server 106 comprises a processor 202, a memory 204, and a network interface 206. The authentication server 106 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an authentication engine 208. In an embodiment, the authentication engine 208 is implemented using logic units, FPGAs, ASICs, DSPs, or any other suitable hardware. The authentication engine 208 is configured to implement a specific set of rules or process that provides an improved technological result.

In one embodiment, the authentication engine 208 is configured to obtain or generate an authentication key 103 that can be linked with a user's account and a set of authentication rules for the user. Examples of authentication keys 103 include, but are not limited to, a token, a cryptographic key, an alphanumeric string, an image, a graphical key, a barcode, or any other suitable type of key. In one embodiment, the authentication engine 208 may obtain an authentication key 103 from a database or memory (e.g. memory 204) storing authentication keys 103. For example, the authentication engine 208 may randomly select an authentication key 103 from pool of authentication keys 103. In another embodiment, the authentication engine 208 may generate an authentication key 103. The authentication engine 208 may generate the authentication key 103 using any suitable technique as would be appreciated by one of ordinary skill in the art. For example, the authentication engine 208 may generate an authentication key 103 based on a user's account information.

The authentication engine 208 uses authentication rules to authenticate the identity of a user. Examples of authentication rules include, but are not limited to, biometric tests such as voice recognition, retinal recognition, fingerprint recognition, text-based questions, image-based questions, audible questions, geolocation tests, hardware tests such as device information, and/or any other suitable kind of question or test. Authentication rules may comprise any suitable number of rules and/or type of rules for authenticating a user. Authentication rules are linked with actions or responses users 101 can provide to authenticate themselves. Examples of types of actions or responses a user 101 can provide to satisfy authentication rules include, but are not limited to, text responses, touchscreen gestures (e.g. clicking or swiping), voice samples, retina scans, fingerprints, geolocation information, user device information, and/or any other suitable type of information or biometric sample. Examples of the authentication server 106 in operation are described in FIGS. 3 and 4.

In one embodiment, the authentication engine 208 is configured to automatically change the authentication rules linked with an authentication key 103 in response to detecting a triggering event. A triggering event is an event or action associated with an increased threat to an account. Triggering events may be used to detect suspicious or malicious activities such as fraud. Examples of triggering events include, but are not limited to, exceeding a spending threshold, receiving a transaction request that exceeds a threshold, determining a user device 102 is in a high-crime area, determining a user device 102 is not in a location a user 101 typically visits, determining a user device 102 not associated with a user 101 is using an authentication key 103, and/or any other suitable type of event or unusual activity. The authentication engine 208 may change the authentication rules that are used to authenticate a user 101 using an authentication key 103 to use more levels of authentication rules and/or more secure types of authentication rules such as biometric or geolocation type authentication rules. For example, the authentication engine 208 may automatically require a user 101 to provide geolocation information about their current location in order to satisfy one of the authentication rules. As another example, the authentication engine 208 may automatically require a user 101 to provide biometric information to confirm their identity in order to satisfy one of the authentication rules. The ability to dynamically and automatically change authentication rules in response to different triggering events provides increased data and network security when the authentication engine 208 determines an account may be at risk of becoming compromised. An example of the authentication engine 208 operating in this configuration is described in FIG. 3.

In one embodiment, the authentication engine 208 is configured to allow an authentication key 103 linked with an account to be split among multiple users 101. Each fragment or portion of the authentication key 103 may be linked with authentication rules for it respective user 101. Using authentication key fragments, the authentication engine 208 increases network security by distributing portions of an authentication key 103 among multiple users 101 where each user 101 has their own set of authentication rules. An example of the authentication engine 208 operating in this configuration is described in FIG. 4.

The memory 204 comprises one or more non-transitory disks, tape drives, or solid-state drives, and may be used as an over-flow data storage device, to store programs when such programs are selected for execution, and to store instructions and data that are read during program execution. The memory 204 may be volatile or non-volatile and may comprise read-only memory (ROM), random-access memory (RAM), ternary content-addressable memory (TCAM), dynamic random-access memory (DRAM), and static random-access memory (SRAM). The memory 204 is operable to store authentication instructions 210, user profiles 212, authentication rules 214, authentication keys 103, and/or any other data or instructions. The authentication instructions 210 comprise any suitable set of instructions, logic, rules, or code operable to execute the authentication engine 208.

In one embodiment, the authentication engine 208 is configured to generate and/or to store user profiles 212 for different users 101. User profiles 212 generally comprise information linked a user 101 and one or more of their accounts. A user profile 212 may comprise account information, user history, user information, sets of authentication rules 214 linked with a user's accounts, any other suitable types of information, or combinations thereof In one embodiment, the authentication engine 208 collects at least a portion of the information for a user profile 212 from a cloud server 104. For example, the authentication engine 208 may periodically collect and store user history information, transaction information, and/or geolocation information for a user 101 in a user profile 212. The authentication engine 208 may periodically collect information linked a user 101 at any suitable time interval.

The network interface 206 is configured to enable wired and/or wireless communications. The network interface 206 is configured to communicate data through the system 100 and/or any other system or domain. For example, the network interface 206 may be configured for communication with a modem, a switch, a router, a bridge, a server, or a client. The processor 202 is configured to send and receive data using the network interface 206.

Figure 3:
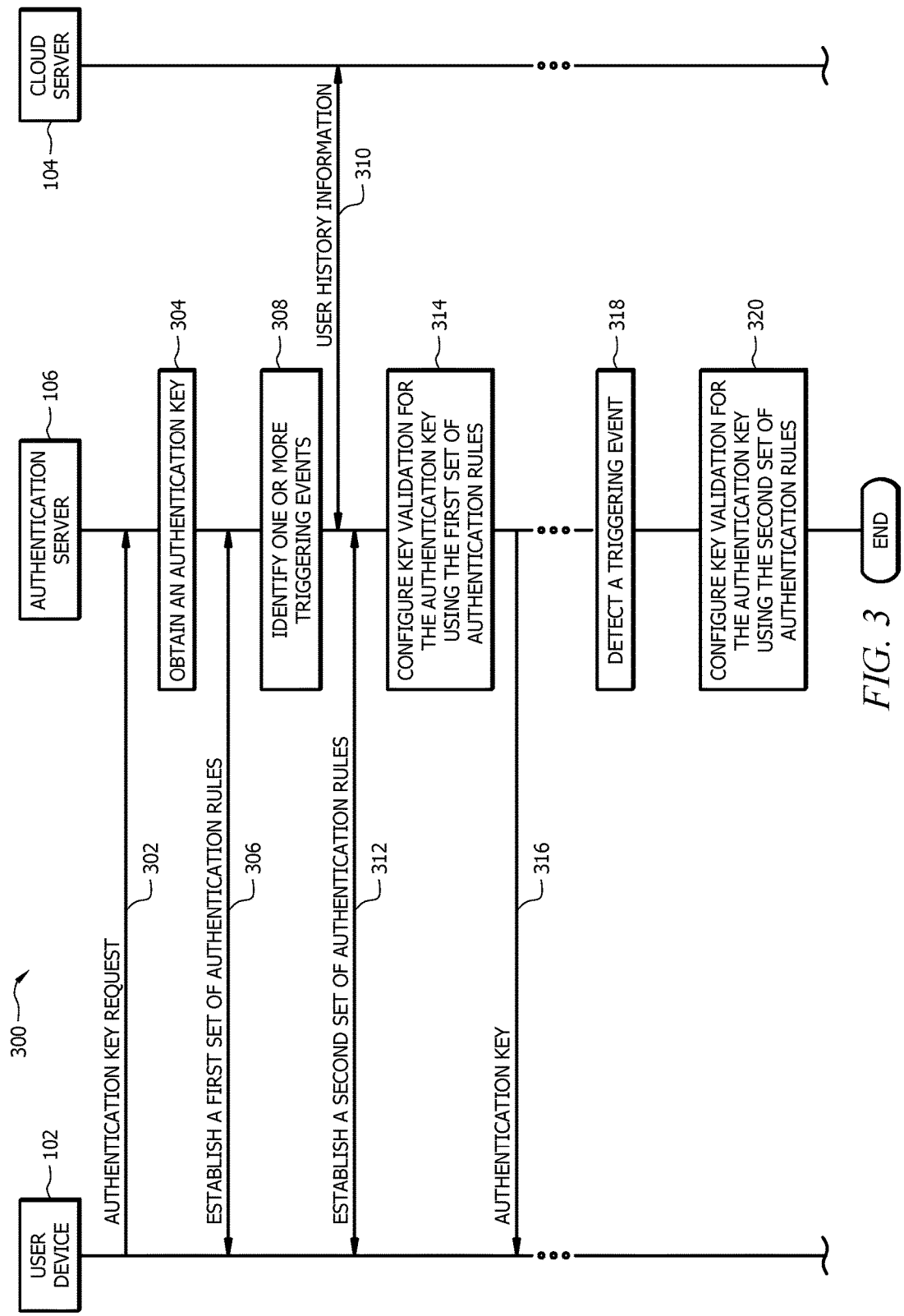
FIG. 3 is a protocol diagram of a multifactor network authentication method.

FIG. 3 is a protocol diagram of a multifactor network authentication method 300. The system 100 implements method 300 to link sets of authentication rules with authentication keys 103 for a user 101. The system 100 adjusts which set of authentication rules is used with an authentication key 103 in response to determining an triggering events have been detected.

Conventional systems use a fixed predetermined set of authentication rules to authenticate a user. These rules are typically rigidly defined rules both terms of the types of rules and the number of rules. Modern networks include a wide variety of user devices with different types of functionality. The rigid set of rules by conventional systems are limited and do not provide the flexibility to support a wide variety of user devices with different types of functionality. In contrast, system 100 provides an unconventional solution that allows a user to define a set of authentication rules which may vary based on the number of authentication rules and/or the types of authentication rules that are used. This process improves the functionality of the system 100 by using user-defined authentication rules that allow the system 100 to be flexible enough to support a larger number of user devices 102. The authentication rules can be defined and set based on the functionality of a user's user devices 102.

A non-limiting example is provided to illustrate how the system 100 implements method 300 to establish and change between authentication rules linked with a user's account. As an example, a user 101 employs user device 102 to request an authentication key 103 for one of their accounts. The authentication key 103 may be later used with another device (e.g. a third-party server 108) in the network 105 to authenticate the user 101.

At step 302, the user device 102 sends an authentication key request to the authentication server 106. In one embodiment, the authentication server 106 provides a graphical interface (e.g. a website or an application) that allows the user 101 to use the user device 102 to send an authentication key request. In one embodiment, the authentication key request identifies an account linked with the user 101. The authentication key request may also further comprise any other suitable information.

At step 304, the authentication server 106 obtains an authentication key 103. In one embodiment, the authentication server 106 may obtain an authentication key 103 from a database or memory (e.g. memory 204). In another embodiment, the authentication server 106 may generate the authentication key 103. The authentication engine 208 may generate the authentication key 103 using any suitable technique as would be appreciated by one of ordinary skill in the art.

At step 306, the authentication server 106 and the user device 102 establish a first set of authentication rules for the authentication key 103. The user 101 may select any number of authentication rules and authentication rule types for the first set of authentication rules. In one embodiment, the authentication server 106 provides a graphical interface (e.g. a website or an application) that allows the user 101 to establish the first set of authentication rules using the user device 102. For example, the user 101 may select to receive text-based question and to respond using text-based responses. As another example, the user 101 selects to receive graphical questions and to respond using voice samples. As another example, the user 101 may select to receive a combination of text-based and audible questions and to respond using gestures on a touch screen. In one embodiment, the user 101 selects the question or stimulus from a pool of questions provided by the authentication server 106. In another embodiment, the user 101 may provide their own questions or stimulus.

In some examples, the user 101 may select to use one or more biometric signals as part of the authentication rules. For example, the user 101 may select to provide a fingerprint to satisfy part of the authentication rules. In another example, the user 101 may select to provide a voice sample to satisfy part of the authentication rules. In another example, the user 101 may select to provide a retinal scan to satisfy part of the authentication rules. In other examples, the user 101 may select to provide any other suitable type of biometric signal to satisfy part of the authentication rules.

At step 308, the authentication server 106 identifies one or more triggering events. In one embodiment, the user 101 may define one or more triggering events. For example, the user 101 may indicate account threshold such as an account balance threshold, a transaction amount threshold, or any other suitable type of trigger or threshold. In one embodiment, the authentication server 106 defines one or more triggering events. For example, the authentication server 106 may identify triggering events based on user history information, geolocation information, or any other suitable type of event that indicates a potential threat to an account. The one or more triggering events may comprise any number of triggering events defined by the user 101 and the authentication server 106.

At step 310, the authentication server 106 may obtain user history information for the user 101 from the cloud server 104. In some embodiments, one or more authentication rules can be derived based on obtained user history information, which provides additional security when verifying the identity of the user 101. For example, one or more authentication rules may be based on the user's previous actions and/or behavior patterns. The authentication server 106 may download or receive user history information that includes, but is not limited to, personal information, account information, user device information, geolocation information, location history information, financial information, shopping information, transaction history information, online browsing history, social media information, and/or any other suitable type of information. For example, the user history may comprise location history information linked with the user 101 that identifies one or more frequently visited locations by the user 101. As another example, the user history comprises user device information identifying user devices associated with the user 101. As another example, the user history information identifies transactions linked with the user 101 and vendors associated with the transactions linked with the user 101. The user history information may comprise any combination of publically available information and private information.

At step 312, the authentication server 106 and the user device 102 establish a second set of authentication rules for the authentication key 103. The user 101 may select any number of authentication rules and authentication rule types for the second set of authentication rules. The second set of authentication rules is different from the first set of authentication rules. For example, the second set of authentication rules may comprise more authentication rules than the first set of authentication rules and/or more secure types of authentication rules such as biometric or geolocation based authentication rules.

In one embodiment, the second set of authentication rules may include one or more authentication rules based on user history information obtained from a cloud server 104. For example, the authentication server 106 may generate questions or stimulus for the user 101 to answer based on the obtained user information. For instance, the second set of authentication rules may include questions about previous transactions, places the user has recently visited or shopped at, online browsing history, or any other user history information.

At step 314, the authentication server 106 configures itself to perform key validation for the authentication key 103 using the first set of authentication rules. In other words, the authentication server 106 configures itself to use the first set of authentication rules to authentication a user 101 using the authentication key 103. At step 316, the authentication server 106 sends the authentication key 103 to the user device 102.

When the authentication server 106 is configured to perform key validation using the first set of authentication rules, the authentication server 106 communicates with the user device 102 to request responses from the user 101 in accordance with the first set of authentication rules. In one embodiment, the authentication server 106 provides a graphical interface that presents the first set of authentication rules and allows the user 101 to provide responses to the first set of authentication rules. The authentication server 106 evaluates the user's 101 responses and validates the authentication key 103 and the identity of the user 101 in response to determining the user 101 has satisfied the first set of authentication rules. In some embodiments, the authentication server 106 may require additional information to verify the identity of the user 101 and to validate the authentication key 103. For example, the authentication server 106 may validate the authentication key 103 in response to determining the first set of authentication rules are satisfied and the determining the current location of the user device using the authentication key 103 is a location frequently visited by the user 101. As another example, the authentication server 106 may validate the authentication key 103 in response to determining the first set of authentication rules are satisfied and the determining the device information for the user device 102 using the authentication key 103 matches the device information of one of the user's user devices. As another example, the authentication server 106 may validate the authentication key 103 in response to determining the first set of authentication rules are satisfied and the determining a vendor identifier where the user device 102 is using the authentication key 103 corresponds with a vendor the user 101 has previously made a transaction with.

Some time later at step 318, the authentication server 106 detects that a triggering event has occurred. The triggering event may be any one of the triggering events identified in step 308. As an example, the authentication server 106 may receive device information for a user device 102 using the authentication key 103 and the triggering event may be the determination that the user device 102 using the authentication key 103 is not a member of the user devices 102 associated with the user 101. For instance, the authentication server 106 may determine that the user device 102 using the authentication key 103 is different from the user device 102 that requested the authentication key 103. In this example, authentication keys 103 may be uniquely assigned to particular user devices 102 or user device types. As another example, the authentication server 106 determines a current location for a user device 102 using the authentication key 103 and the triggering event may be the determination that the current location for the user device 102 is not a location from among frequently visited locations by the user 101. As another example, the authentication server 106 receives an authentication request comprising a vendor identifier and the triggering event may be the determination that the vendor identifier is not associated with vendors associated with transactions linked with the user 101.

In some embodiments, the authentication server 106 detects a triggering event before an authentication request is received in the current location of the user 101. For example, the authentication server 106 periodically receives location information for a user device 102 associated with a user 101. The authentication server 106 determines the current location for the user based on the location information and the triggering event may be the determination that the current location of the user 101 is a location associated with a high threat level for the user 101 and their account. For example, the authentication server 106 may determine the user 101 is a location associated with a high-level of fraud or theft.

At step 320, the authentication server 106 configures itself to perform key validation for the authentication key 103 using the second set of authentication rules. In other words, the authentication server 106 configures itself to use the second set of authentication rules to authentication a user 101 using the authentication key 103 to provide additional security. This process allows the system 100 to be flexible to enough support a large number of device with different types of functionality by using user-defined rules while still being responsive to potential threats (i.e. triggering events) to provide additional security by using a more secure set of authentication rules.

Figure 4:
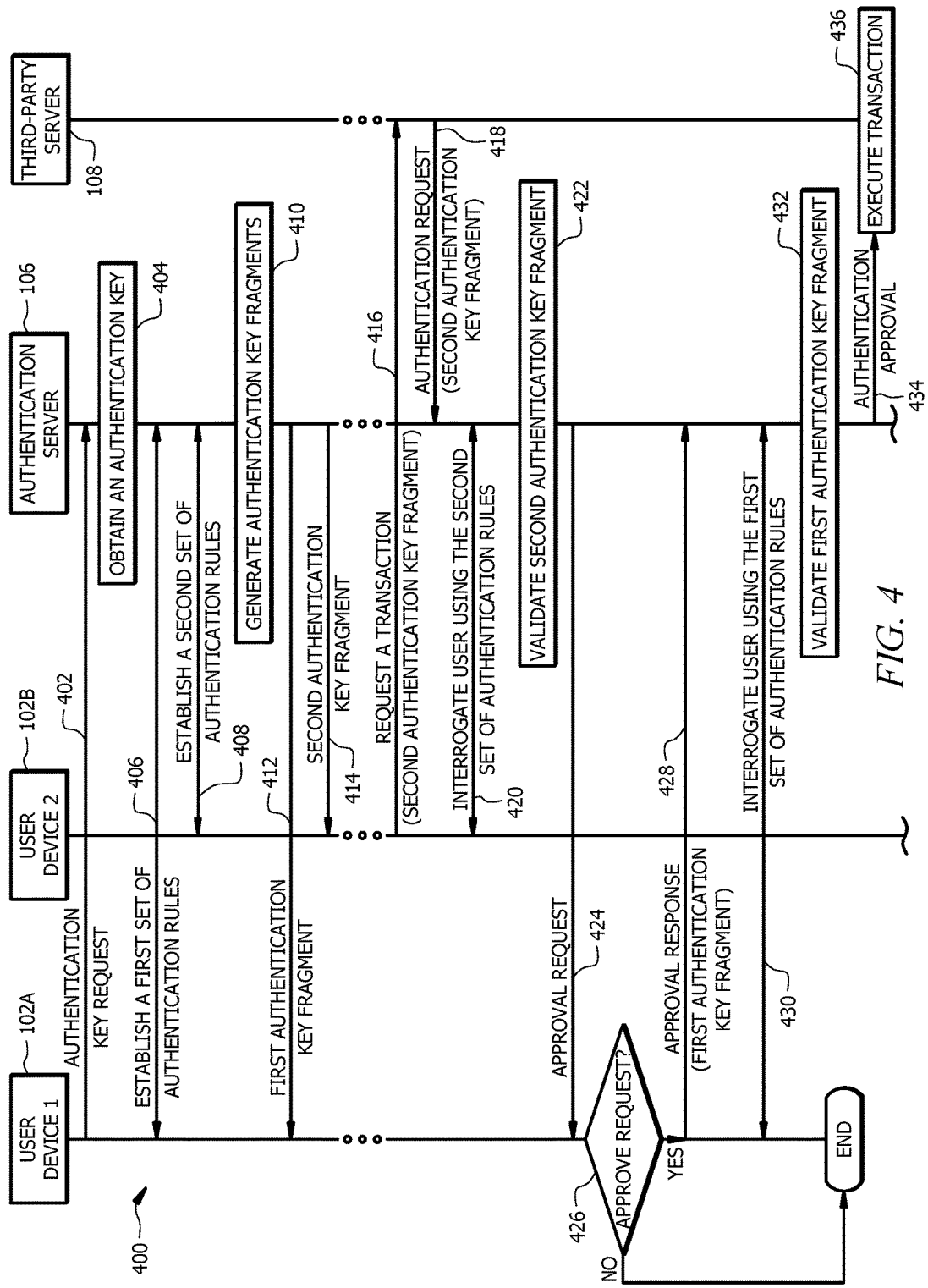
FIG. 4 is a protocol diagram of a multifactor network authentication method using fragmented authentication keys.

FIG. 4 is a protocol diagram of a multifactor network authentication method 400 using fragmented authentication keys 103. The system 100 implements method 400 to split an authentication key 103 among multiple users 101 and to facilitate authentication using the authentication key fragments.

Conventional systems use authentication keys that are assigned to a particular user. These systems do not provide the ability to allow an authentication key to be fragmented and shared among multiple users 101. In contrast, system 100 provides an unconventional solution that allows an authentication key 103 to be broken up into authentication key fragments that can be used by multiple users 101 to perform authentication. Unlike conventional systems that only assign an authentication key to a particular user, system 100 allows an authentication key 103 to be assigned to multiple users 101 in the form of authentication key fragments. The ability to break up an authentication key 103 among multiple user provides increased network security by involving multiple users 101 and their portions of the authentication key 103 for authentication.

A non-limiting example is provided to illustrate how the system 100 implements method 400 to generate authentication key fragments and to facilitate authentication using the authentication key fragments. As an example, a parent is interested in allowing their teenager to perform activities on one of the parent's account (e.g. a cloud data streaming services account or an online shopping account). System 100 generates authentication key fragments that allows the teenager to perform activities on the parent's account when both the teenager and the parent successfully authenticate themselves.

At step 402, the first user device 102A sends an authentication key request to the authentication server 106. In this example, the parent uses their user device 102 (i.e. the first user device 102A) to send the authentication key request to the authentication server 106. In one embodiment, the authentication key request identifies an account linked with a first user (e.g. the parent) and a user device 102B for the second user (e.g. the teenager). The first user device 102A may send an authentication key request using a process similar to the process described in step 302 in FIG. 3.

In some embodiments, the authentication key request may identify limitations or constraints for the generated authentication key fragments. For example, the authentication key request may indicate that the authentication key fragments are only valid for a particular amount of time or during a particular time interval (e.g. weekdays, weekends, evening, etcs.). For instance, the authentication server 106 may set a validation timer to monitor or track when authentication key fragments are valid.

At step 404, the authentication server 106 obtains an authentication key 103. The authentication server 106 may obtain the authentication key 103 using a process similar to the process described in step 304 in FIG. 3.

At step 406, the authentication server 106 and the first user device 102A establish a first set of authentication rules for the authentication key 103. In this example, the parent establishes a set of authentication rules (i.e. the first set of authentication rules) that they will use to authenticate themselves when using the authentication key 103 or an authentication key fragment. Establishing the first set of authentication rules may be performed using a process similar to the process described in step 306 in FIG. 3. In one embodiment, the parent may also use the first user device 102A to establish one or more additional sets of authentication rules that may be used in the event the authentication server 106 detects a triggering event. Establishing the one or more additional sets of authentication rules and identifying triggering events may be performed using process similar to the process described in steps 308-312 in FIG. 3.

At step 408, the authentication server 106 and the second user device 102B establish a second set of authentication requirements for the authentication key 103. In this example, the teenager establishes a set of authentication rules (i.e. the second set of authentication rules) that they will use to authenticate themselves when using the authentication key 103 or authentication key fragment. Establishing the second set of authentication rules may be performed using a process similar to the process described in step 306 in FIG. 3. In one embodiment, the teenager may also use the second user device 102B to establish one or more additional sets of authentication rules that may be used in the event the authentication server 106 detects a triggering event. Establishing the one or more additional sets of authentication rules and identifying triggering events may be performed using process similar to the process described in steps 308-312 in FIG. 3.

At step 410, the authentication server 106 generates a first authentication key fragment and a second authentication key fragment. For example, the authentication key 103 may be a cryptographic key and the authentication server 106 may split the cryptographic key into two halves. The authentication server 106 may use a first half of the cryptographic key as the first authentication key fragment and the second half of the cryptographic key as the second authentication key fragment. In other examples, the authentication server 106 may use any other suitable ratio to split the cryptographic key into two portions. In other examples, the authentication server 106 may use any other technique or process to derive the first authentication key fragment and the second authentication key fragment from the original authentication key 103.

At step 412, the authentication server 106 sends the first authentication key fragment to the first user device 102A. At step 414, the authentication server 106 sends the first authentication key fragment to the second user device 102B.

Some time later at step 416, the second user device 102B sends a transaction request to the third-party server 108. As an example, the teenager may try to make a purchase using the parent's account that is linked with the authentication key 103 and the authentication key fragments. The purchase may be for goods or services at a physical store or in an online marketplace. The teenager uses user device 102B to send a transaction request that comprises the second authentication key fragment to a third-party server 108.

At step 418, the third-party server 108 sends an authentication request to the authentication server 106 to authenticate the user 101 that is using an authentication key fragment. The authentication request comprises the second authentication key fragment. In some embodiments, the authentication request may further comprise additional other information associated with the transaction. For example, the authentication request may comprise a device identifier for the user device 102 using the authentication key 103, a user identifier for the user 101 using the authentication key 103, a vendor identifier, a location identifier (e.g. the current location), a timestamp, a product identifier, and/or any other suitable type of information.

At step 420, the authentication server 106 interrogates second user via the second user device 102B using the second set of authentication rules. In other words, the authentication server 106 uses the set of authentication rules defined by the second user (i.e. teenager) to authenticate the second user. The authentication server 106 may interrogate the second user using a graphical interface, a webpage, an application, or any other suitable mechanism in accordance with the second set of authentication rules. At step 422, the authentication server 106 validates the second authentication key fragment in response to the second user satisfying the second set of authentication rules.

At step 424, the authentication server 106 sends an approval request to the first user device 102A in response to validating the second authentication key fragment and authenticating the second user. The approval request comprises information about the requested transaction. The authentication server 106 sends to the approval request to the first user device 102A to provide the first user (i.e. the parent) the opportunity to review the transaction being requested by the second user (i.e. the teenager). For example, the approval request may comprise a user identifier for the second user, an authentication key identifier, a transaction amount, a vendor identifier, a location identifier, a timestamp, a product identifier, and/or any other suitable type of information. The authentication server 106 may send the approval request using any suitable messaging technique or protocol. For example, the authentication server 106 may send the approval request as an email, a text message, a short message service (SMS) message, an application notification, a call message, or any other suitable type of notification or message.

At step 426, the first user device 102A determines whether the first user approves the transaction. The first user may approve or deny the approval request using a touchscreen gesture (e.g. a clicking or swiping), a text response, a voice response, or any other suitable mechanism. For example, the first user (i.e. the parent) may respond by clicking whether they approve the transaction when they receive the approval request as a pop-up notification. As another example, the first user may respond using voice commands when they receive the approval request as a phone call or voice message. The first user device 102A proceeds to step 428 when the first user approves the transaction. The first user device 102A terminates method 400 when the first user does not approve the transaction. In other words, when the first user does not approve the transaction, the transaction is automatically terminated. The process allows the account owner (i.e. first user) to monitor and control which operations are performed on their account. The first user has the ability to override any unauthorized account activity.

At step 428, the first user device 102A sends an approval response to the authentication server 106 in response the first user approving the transaction. The approval response comprises the first authentication key fragment which indicates the first user approves of the transaction.

At step 430, the authentication server 106 interrogates the first user via the first user device 102A using the first set of authentication rules in response to receiving the approval response comprising the first authentication key fragment. In other words, the authentication server 106 uses the set of authentication rules defined by the first user (i.e. parent) to authenticate the first user. The authentication server 106 may interrogate the first user using a graphical interface, a webpage, an application, or any other mechanism in accordance with the second set of authentication rules. At step 432, the authentication server 106 validates the first authentication key fragment in response to the first user satisfying the first set of authentication rules.

At step 434, the authentication server 106 sends an authentication approval to the third-party server 108 in response to validating the first authentication key fragment and authenticating the first user. The authentication approval indicates that the second user and the second authentication key fragment have been authenticated and the third-party server 108 is approved to perform the requested transaction. The authentication server 106 may send the authentication approval using any suitable messaging technique or protocol. At step 436, the third-party server 106 executes the transaction requested by the second user device 102B in response to receiving the authentication approval.

In other embodiments, authentication key fragments may be used to perform actions related to an account based on a consensus. For example, an authentication key 103 that is linked with an account may be segmented into five authentication key fragments. Each authentication key fragment may be distributed to different users 101 by the authentication server 106. Actions on the account can only be performed when a majority of the authentication key fragments for the account are received and validated by the authentication server 106. In this example, the authentication server 106 would have to validate at least three of the five authentication key fragments before any actions can be performed on the account. In other examples, the authentication key may be divided into any other suitable number of authentication key fragments. In some examples, actions on the account can be performed when the number of authentication key fragments for the account are received and validated by the authentication server 106 exceeds a predetermined threshold value.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A network authentication system, comprising:
a cloud server implemented in hardware, configured to:
   store information linked with one or more accounts for a user;
   receive a request for user history for the user from an authentication server; and
   send the requested user history information for the user to the authentication server; and
an authentication server implemented in hardware, wherein the authentication server is in signal communication with the cloud server, and configured to:
   receive an authentication key request from a user device, wherein the authentication key request identifies an account linked with the user;
   obtain an authentication key in response to receiving the authentication key request;
   establish a first set of authentication rules for the authentication key, wherein the first set of authentication rules identifies:
      a first number of authentication rules selected by the user; and
      an authentication type for each authentication rule in the first set of authentication rules selected by the user;
   identify one or more triggering events for the account, wherein a triggering event is an event associated with an increased threat to the account;
   establish a second set of authentication rules for the authentication key, wherein:
      the second set of authentication rules identifies:
         a second number of authentication rules; and
         an authentication type for each authentication rule in the second set of authentication rules; and
      the second set of authentication rules is different from the first set of authentication rules;
   configure key validation for the authentication key using the first set of authentication rules;
   send the authentication key to the user device;
   detect a triggering event from the one or more triggering events has occurred; and
   configure the key validation for the authentication key using the second set of authentication rules in response to detecting the triggering event.

2. The system of claim 1, wherein the user selects:
the second number of authentication rules; and
the authentication types for each authentication rule in the second set of authentication rules.

3. The system of claim 1, wherein detecting the triggering event comprises:
receiving device information for the user device using the authentication key; and
determining the user device is not a member of the one or more user devices associated with the user.

4. The system of claim 1, wherein:
the authentication server is configured to obtain location history linked with the user from the cloud server, wherein the location history identifies one or more frequently visited locations by the user; and
detecting the triggering event comprises:
   determining a current location for the user device using the authentication key; and
   determining the current location for the user device is not a location from among the one or more frequently visited locations by the user.

5. The system of claim 1, wherein:
detecting the triggering event comprises:
   receiving location information for the user device using the authentication key;
   determining a current location for the user based the location information; and
   determining the current location is a location associated with a high threat level for the account; and
   detecting the triggering event occurs before an authentication request is received in the current location.

6. The system of claim 1, wherein:
the authentication server is configured to:
   obtain user history information linked with the user from the cloud server, wherein the user history information identifies:
      transactions linked with the user; and
      vendors associated with the transactions linked with the user;
   receive an authentication request comprising a vendor identifier and the authentication key; and
detecting the triggering event comprises determining the vendor identifier is not associated with one of the vendors associated with the transactions linked with the user.

7. A network authentication device comprising:
a network interface in signal communication with one or more user devices associated with a user; and
an authentication engine implemented in hardware, wherein the authentication server is in signal communication with the network interface, and configured to:
   receive an authentication key request from the user device, wherein the authentication key request identifies an account linked with the user;
   obtain an authentication key in response to receiving the authentication key request;
   establish a first set of authentication rules for the authentication key, wherein the first set of authentication rules identifies:
      a first number of authentication rules selected by the user; and
      an authentication type for each authentication rule in the first set of authentication rules selected by the user;
   identify one or more triggering events for the account, wherein a triggering event is an event associated with an increased threat to the account;
   establish a second set of authentication rules for the authentication key, wherein:
      the second set of authentication rules identifies:
         a second number of authentication rules; and
         an authentication type for each authentication rule in the second set of authentication rules; and
      the second set of authentication rules is different from the first set of authentication rules;
   configure key validation for the authentication key using the first set of authentication rules;
   send the authentication key to the user device;
   detect a triggering event from the one or more triggering events has occurred; and
   configure the key validation for the authentication key using the second set of authentication rules in response to detecting the triggering event.

8. The device of claim 7, wherein the user selects:
the second number of authentication rules; and
the authentication types for each authentication rule in the second set of authentication rules.

9. The device of claim 7, wherein detecting the triggering event comprises:
receiving device information for the user device using the authentication key; and
determining the user device is not a member of the one or more user devices associated with the user.

10. The device of claim 7, wherein:
the network interface is in signal communication with a cloud server;
the authentication engine is configured to obtain location history linked with the user from the cloud server, wherein the location history identifies one or more frequently visited locations by the user; and
detecting the triggering event comprises:
determining a current location for the user device using the authentication key; and
determining the current location for the user device is not a location from among the one or more frequently visited locations by the user.

11. The device of claim 7, wherein:
detecting the triggering event comprises:
receiving location information for the user device using the authentication key;
determining a current location for the user based the location information; and
determining the current location is a location associated with a high threat level for the account; and
detecting the triggering event occurs before an authentication request is received in the current location.

12. The device of claim 7, wherein:
the network interface is in signal communication with a cloud server;
the authentication engine is configured to:
obtain user history information linked with the user from the cloud server, wherein the user history information identifies:
transactions linked with the user; and
vendors associated with the transactions linked with the user;
receive an authentication request comprising a vendor identifier and the authentication key; and
detecting the triggering event comprises determining the vendor identifier is not associated with one of the vendors associated with the transactions linked with the user.

13. The device of claim 7, wherein the second set of authentication rules comprises at least one authentication rule with a biometric authentication type.

14. An authentication method, comprising:
receiving, by an authentication server, an authentication key request from a user device, wherein the authentication key request identifies an account linked with the user;
obtaining, by the authentication server, an authentication key in response to receiving the authentication key request;
establishing, by the authentication server, a first set of authentication rules for the authentication key, wherein the first set of authentication rules identifies:
a first number of authentication rules selected by the user; and
an authentication type for each authentication rule in the first set of authentication rules selected by the user;
identifying, by the authentication server, one or more triggering events for the account, wherein a triggering event is an event associated with an increased threat to the account;
establishing, by the authentication server, a second set of authentication rules for the authentication key, wherein:
the second set of authentication rules identifies:
a second number of authentication rules; and
an authentication type for each authentication rule in the second set of authentication rules; and
the second set of authentication rules is different from the first set of authentication rules;
configuring, by the authentication server, key validation for the authentication key using the first set of authentication rules;
sending, by the authentication server, the authentication key to the user device;
detecting, by the authentication server, a triggering event from the one or more triggering events has occurred; and
configuring, by the authentication server, the key validation for the authentication key using the second set of authentication rules in response to detecting the triggering event.

15. The method of claim 14, wherein the user selects:
the second number of authentication rules; and
the authentication types for each authentication rule in the second set of authentication rules.

16. The method of claim 14, wherein detecting the triggering event comprises:
receiving device information for the user device using the authentication key; and
determining the user device is not a member of the one or more user devices associated with the user.

17. The method of claim 14, further comprising obtaining, by the authentication server, location history linked with the user from a cloud server, wherein the location history identifies one or more frequently visited locations by the user; and
wherein detecting the triggering event comprises:
determining a current location for the user device using the authentication key; and
determining the current location for the user device is not a location from among the one or more frequently visited locations by the user.

18. The method of claim 14, wherein:
detecting the triggering event comprises:
receiving location information for the user device using the authentication key;
determining a current location for the user based the location information; and
determining the current location is a location associated with a high threat level for the account; and
detecting the triggering event occurs before an authentication request is received in the current location.

19. The method of claim 14, further comprising:
obtaining, by the authentication server, user history information linked with the user from a cloud server, wherein the user history information identifies:
transactions linked with the user; and
vendors associated with the transactions linked with the user;

receiving, by the authentication server, an authentication request comprising a vendor identifier and the authentication key; and wherein detecting the triggering event comprises determining the vendor identifier is not associated with one of the vendors associated with the transactions linked with the user.

20. The method of claim 14, wherein the second set of authentication rules comprises at least one authentication rule with a biometric authentication type.

* * * * *